United States Patent Office.

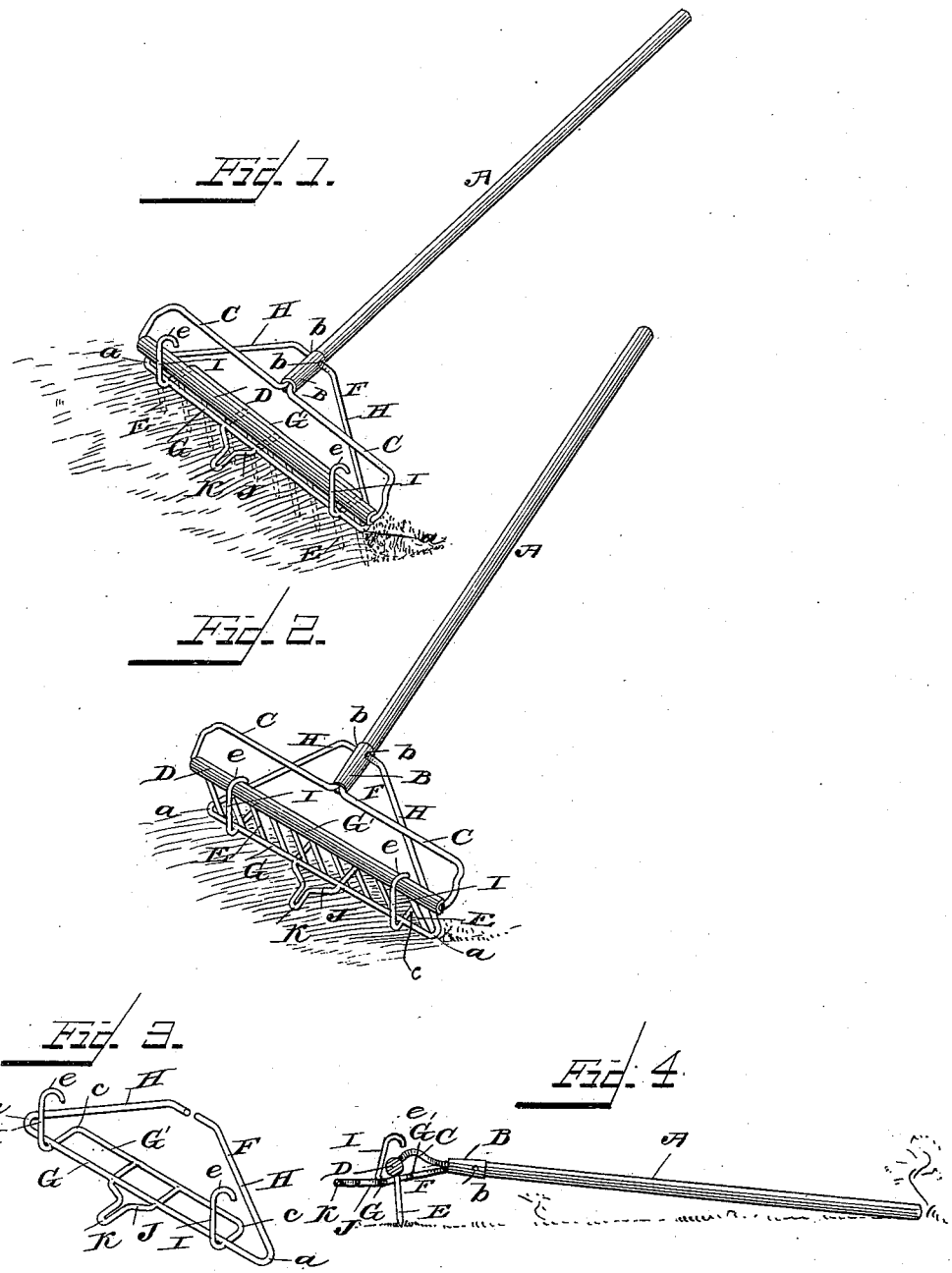

GEORGE H. VAN WINKLE, OF HORNELLSVILLE, NEW YORK, ASSIGNOR OF ONE-HALF TO RICHARD W. BARNEY, OF SAME PLACE.

RAKE.

SPECIFICATION forming part of Letters Patent No. 333,267, dated December 29, 1885.

Application filed May 7, 1885. Serial No. 164,697. (No model.)

*To all whom it may concern:*

Be it known that I, GEORGE H. VAN WINKLE, a citizen of the United States, residing at Hornellsville, in the county of Steuben and State of New York, have invented a new and useful Improvement in Rakes, of which the following is a specification, reference being had to the accompanying drawings.

This invention relates to rakes, and has for its object to provide an attachment for discharging the accumulations between and around the teeth of a rake.

Heretofore the most disagreeable part of raking has consisted in dislodging the matter adhering to the teeth of the rake. Various means have been resorted to, but to no purpose, the different constructions employed being either impracticable in operation or too expensive in manufacturing. To overcome these objections, I have devised the present improvement, which can be attached with ease to the various forms of rakes without making any change in their construction, and which will automatically discharge the rubbish from the rake every time it is raised from the ground, thereby serving to keep the teeth clean and free from accumulations of matter, enabling the operation of raking to be performed with more satisfaction and less difficulty to the operator.

With these ends in view the said invention consists in certain details of construction and novel combination of parts, as will be hereinafter set forth, and particularly pointed out in the claims.

In the accompanying drawings, Figure 1 is a perspective view showing the attachment applied to an ordinary form of rake and in the position assumed while raking. Fig. 2 is a similar view showing the attachment down in the position assumed when raising the rake from off the ground. Fig. 3 is a detail view of the attachment. Fig. 4 is a longitudinal vertical section of Fig. 1.

Like letters are used to indicate corresponding parts in the several figures.

Referring to the drawings, A designates the handle, B the ferrule, C C the wire braces, D the rake-head, and E the teeth, of an ordinary form of rake to which my improvement is applied.

F designates my attachment, (seen in detail, Fig. 3,) comprising two parallel longitudinal bars, G G', the front bar, G, being extended beyond the other and formed with a bend, as at $a$, arms H H extending from said bends in an inclined line and having their extremities inserted into holes $b\ b$, provided on each side of the ferrule B. The bar G' has its ends turned forward, as at $c\ c$, to connect with the front bar, G, and extending up from the latter at this point are two vertical curved arms, I, which have their upper ends bent rearwardly to form hooks $e\ e$, which fit over the rake-head and limit the downward movement of the attachment. A bail or yoke, J, has its arms secured to the rear bar, G', and front bar, G, near the center, and extending forward beyond the latter, the central portion of the arms being doubled or bent parallel to each other to provide a projecting arm, K, which in operation strikes against the ground so as to raise the attachment.

The operation of my invention will be readily understood from the foregoing description, taken in connection with the annexed drawings. In applying the attachment to the rake the arms H are sprung apart to allow the insertion of the rake between the same, the rake-head being caught under the hooks of the arms I and the teeth projecting downward in the space between the bars G G'. In normal position the ends of the arms H are received within the holes provided in the ferrule, and this connection allows the attachment to swing up and down. The bend $a$, provided at the end of the extended bar G, fits around the sides of the rake and guides the attachment in its movement. The parallel bars G G' are arranged in front and in rear of the teeth, and move vertically along the same, the end $c$ of the bar G working between the two last teeth of the rake. The arms of the yoke or bail J each work between two teeth of the rake, so as to clean the accumulations of matter therefrom.

I have shown the ends $c$ of the bar G and the ends of the bail J as working between the teeth to effect the end in view; but it will be apparent that I may connect the parallel bars G G' by any number of short rods or bars to work between every two teeth of the rake, to effect a more thorough cleaning thereof.

In practice the entire attachment is intended to be cast in one solid piece, so as to avoid the necessity of fitting the parts together.

When in operation, the attachment being weighted at the front end drops down automatically, the bars G G' coming on a line with the extreme points of the rake-teeth, the hook-arms I I catching around the rake-head and holding the attachment from further movement. As the rake is drawn along the projecting arm K strikes against the ground and causes the swinging of the attachment in an upward direction, the hook-arms I being thrown above the rake-head. In this position the bars G G' are up at the extreme limit of their movement, leaving the teeth of the rake free to act upon the soil in a manner well known in the art. As soon as the rake is raised from the ground, or when the pressure against the projecting arm K is relieved, the attachment is allowed to swing down into its normal position. (Seen in Fig. 2.) In this downward movement the bars G G', the ends of the bail J, and the ends c of the rear bar, G', act upon or around the rake-teeth, and causing the accumulation of matter adhering to or projecting therefrom to be cleaned from the teeth.

It will be observed that by the peculiar connection of the attachment to the rake the teeth of the latter are automatically cleaned each time that the rake is raised from the ground. This end is effected by making the attachment heavier at its front end, so as to drop down by its own weight when pressure is released from the projecting arm K.

Changes in the form and construction of the several parts may be resorted to without departing from the spirit or scope of my invention.

The projecting arm K of the attachment is the important feature of my invention, and it is on this that I lay special claim, since it enables the attachment to be held up out of the way while raking. This arm may be made of a single piece, and it also may project downward instead of forward; but this construction is not as desirable, on account of interfering with the free action of the teeth of the rake when in operation.

In defining my invention, I would state that it has been proposed to provide a rake with a swinging attachment having fingers to clear the teeth of the rake from accumulations of matter; but in this construction the attachment could not be applied to all forms of rakes without changing the latter. Furthermore, this attachment did not have an arm to act upon the ground and raise it out of the way while raking, and hence it was impracticable for many reasons.

Having described my invention, I claim—

1. The rake, in combination with the attachment hinged or pivoted to the rake so as to swing in a vertical line around and between the rake-teeth, and provided with a projecting arm arranged and adapted to come in contact with the ground and raise the attachment so as to allow the rake-teeth to act freely, for the purpose set forth.

2. The combination, with the rake, of the herein-described attachment, comprising parallel bars connected by short transverse bars to work between the rake-teeth, arms extending from the parallel bars and hinged or pivoted to the rake, hooks projecting upward from the parallel bars and arranged to limit the downward movement of the attachment, and an arm projecting forward from the bars, for the purpose set forth.

3. The combination, with the rake, of the herein-described attachment, comprising parallel bars provided with means for acting upon the accumulations of matter between the teeth, arms hinging or pivoting the bars to the rake, and an arm or projection provided on the bars, for the purpose set forth.

4. The herein-described attachment, comprising the main portion which acts upon the rake-teeth, hooks provided on the main portion, and a projection or arm, for the purpose set forth.

5. The combination, with the rake, of the herein-described attachment, comprising the main portion formed of parallel bars connected by short transverse bars which act between the rake-teeth, said main portion being hinged to the rake, curved hooks projecting upward and catching around the rake-head, and an arm or projection which acts upon the ground, as set forth.

6. The rake, in combination with the attachment hinged or pivoted thereto and working in a vertical line around and between the rake-teeth, said attachment being heavier at its front end, so as to drop down automatically by its own weight when the rake is raised from the ground, and hooks e, provided on the attachment to catch over the rake-head so as to limit the downward movement, as set forth.

7. The rake, in combination with the attachment having its main portion working between and around the rake-teeth, and spring-arms provided on the attachment, said arms being adapted to be sprung apart so as to be inserted into holes provided at the front end of the rake, as and for the purpose set forth.

In testimony that I claim the foregoing as my own I have hereto affixed my signature in presence of two witnesses.

GEORGE H. VAN WINKLE.

Witnesses:
RICHD. W. BARNEY,
A. S. VAN WINKLE.